United States Patent [19]

Lim et al.

[11] Patent Number: 5,384,700
[45] Date of Patent: Jan. 24, 1995

[54] METHOD AND SYSTEM FOR STORING MULTIPLE, MODIFIABLE YOMI AND KANJI STRINGS IN A STRUCTURED DOCUMENT

[75] Inventors: Chan S. Lim, Potomac; Kevin M. McBride, Bethesda, both of Md.; Takaki Wakejima, Kanagawa, Japan

[73] Assignee: International Business Machines Corporation, Armonk, N.Y.

[21] Appl. No.: 968,017

[22] Filed: Oct. 29, 1992

[51] Int. Cl.6 .............................. G06F 15/38
[52] U.S. Cl. ...................... 364/419.1; 364/419.01
[58] Field of Search ............... 364/419.01, 419.02, 364/419.04, 419.05, 419.07, 419.08, 419.09, 419.1; 395/144, 145, 146

[56] References Cited

U.S. PATENT DOCUMENTS

| | | | |
|---|---|---|---|
| 4,498,148 | 2/1985 | Glickman | 364/419.12 |
| 4,543,631 | 9/1985 | Kurosu et al. | 364/419.02 |
| 4,559,614 | 12/1985 | Peek et al. | 395/500 |
| 4,599,612 | 7/1986 | Kaji et al. | 364/419.02 |
| 4,737,779 | 4/1988 | Somigli et al. | 345/193 |
| 4,745,561 | 5/1988 | Hirosawa et al. | 395/150 |
| 4,751,740 | 6/1988 | Wright | 382/1 |
| 4,755,955 | 7/1988 | Kimura et al. | 395/148 |
| 4,774,666 | 9/1988 | Miyao et al. | 364/419.02 |
| 4,787,038 | 11/1988 | Doi et al. | 364/419.02 |
| 4,791,587 | 12/1988 | Doi | 364/419.02 |
| 4,831,529 | 5/1989 | Miike et al. | 364/419.04 |
| 4,868,913 | 9/1989 | Tse-Kai | 345/171 |
| 4,933,880 | 6/1990 | Borgendale et al. | 395/147 |
| 4,949,287 | 8/1990 | Yamaguchi et al. | 395/147 |
| 4,954,979 | 9/1990 | Elbner et al. | 395/150 |
| 5,043,712 | 8/1991 | Kihara et al. | 345/195 |
| 5,079,701 | 1/1992 | Kuga et al. | 364/419.11 |
| 5,084,817 | 1/1992 | Kumano et al. | 364/419.04 |
| 5,084,820 | 1/1992 | Nagaya et al. | 364/419.14 |
| 5,091,878 | 2/1992 | Nagasawa et al. | 364/419.14 |

FOREIGN PATENT DOCUMENTS

| | | | |
|---|---|---|---|
| 0017470 | 2/1981 | Japan | 364/419.02 |
| 0052963 | 3/1982 | Japan | 364/419.09 |
| 0144247 | 8/1983 | Japan | 364/419.09 |
| 0079339 | 5/1984 | Japan | 364/419.09 |
| 0146329 | 8/1984 | Japan | 364/419.09 |
| 0238966 | 11/1985 | Japan | 364/419.02 |

OTHER PUBLICATIONS

IBM Manual, "DOS Bunsho (Language) Program II Operation Guide" (N:SH18-2131-2) (Partial Translation of p. 79).

*Primary Examiner*—David M. Huntley
*Attorney, Agent, or Firm*—John E. Hoel; Edward H. Duffield

[57] ABSTRACT

An improved Yomi and Kanji phrase editing method and system are provided. In accordance with the invention, a structured document editor includes a normal state, a Yomi state, a Kanji state, and an active state. In the normal state, when the operator types Yomi characters on the keyboard, the corresponding Yomi character is directly displayed on the display. In the Yomi state, when a Yomi character is typed on the keyboard, a Yomi text node structure is assembled. The text node structure in the Yomi state will include the Yomi character string along with control information. When the operator wishes to convert the Yomi phrases into the corresponding Kanji phrases, the Yomi string is accessed from the Yomi text node structure and is subjected to a conversion process. The process returns each Kanji phrase and the corresponding Yomi phrase and a bookmark to the conversion table which was used in carrying out the conversion. In accordance with the invention, the returned Kanji phrase and corresponding Yomi phrase and the bookmark are assembled into a new text node structure. The new text node structure assembles a Kanji phrase structure and a corresponding Yomi phrase structure for each Kanji phrase returned in the conversion process. The Kanji phrase structure includes a pointer to the corresponding Yomi phrase structure and the Yomi phrase structure, in turn, includes a return pointer to the Kanji phrase structure. Also included in the Kanji phrase structure and Yomi phrase structure is control information which provides for the display of the Kanji phrase structure which will substitute the Yomi phrase structure.

4 Claims, 10 Drawing Sheets

FILE  EDIT  CONVERT ELEMENT SEARCH  FORMAT PROOFREAD HELP
AUTO SELECT                    PARAGRAPH                INSERT PAGE 1 / LINE 1

| DBCS | YOMI | HIRAGANA | MINCHO 64 | 16 | PREV TEXT | NEXT TEXT | → Y1 .. Y8 |

FIG. 8

FILE  EDIT  CONVERT ELEMENT SEARCH  FORMAT PROOFREAD HELP
AUTO SELECT                    PARAGRAPH                INSERT PAGE 2 / LINE 1

今日はよい天気|
K1 K2 K3 | K4 K5 | K6 K7
KANJI PHRASE 1 | KANJI PHRASE 2 | KANJI PHRASE 3

FILE  EDIT  CONVERT ELEMENT SEARCH FORMAT PROOFREAD HELP
AUTO SELECT                    PARAGRAPH         INSERT       PAGE 3 / LINE 2

きょうはTODAYよい
Y1 Y2 Y3 Y4                K1 K2
IS 天気 A NICE DAY|
   K3  K4

METHOD AND SYSTEM FOR STORING MULTIPLE, MODIFIABLE YOMI AND KANJI STRINGS IN A STRUCTURED DOCUMENT

BACKGROUND OF THE INVENTION

1. Technical Field

The invention disclosed broadly relates to data processing systems and methods and more particularly relates to an improved system and method for manipulating Yomi and Kanji strings in a structured document.

2. Background Art

Related copending patent application entitled "Style Component of a WYSIWYG Text Editor," by K. W. Borgendale, et al., filed May 14, 1990, now U.S. Pat. No. 5,276,793 issued Jan. 4, 1994 assigned to IBM and incorporated herein by reference.

The following terminology is used throughout this patent application and can be used for data base searches.

Hiragana - A set of phonetic characters that were derived by simplifying Kanji. Grammatical elements such as verb and adjective endings, auxiliary verbs, participles, and conjunctions are written in Hiragana.

Katakana - A set of phonetic characters primarily used for words and names of foreign origin, emphasis, and names of plants and animals.

Kanji - A set of ideographic characters originally derived from Chinese characters. Each Kanji has one or more pronunciations associated with it, and the way it is actually pronounced can be determined only after looking at the context (surrounding characters) in which it occurs. Nouns, verb stems, and adjectives are usually written in Kanji. Chinese numbers (Kan Suji) are also included in this category.

Normal State - This state is the finalized text state. The text is normal state may no longer be manipulated with Kanji conversion commands, whether in conversion mode or non-conversion mode.

Yomi State - The Yomi state indicates that the text has not been converted. Yomi text can be either Hiragana or Katakana. Yomi state text can be converted to Kanji when in Kanji conversion mode.

Kanji State - The Kanji state indicates that the text has been converted but not yet changed to normal state. The text in Kanji state can be changed back to the original Yomi state text if the document is in conversion mode.

Fixed/Unfixed - A string is said to be fixed if it has been changed from Yomi state to normal state or form Kanji state to normal state. Yomi and Kanji state strings are unfixed otherwise.

Active State - A Yomi or Kanji state string is in active state if it is ready for Kanji conversion commands, i.e., any conversion commands which are issued will be applied to the active-state text. Text can only be in active state when conversion is enabled, i.e., the system is in conversion mode. In the examples the active-state text will be highlighted in reverse video.

Kana-Kanji Conversion - The sounds of Kanji characters can be represented by Hiragana or Katakana characters. Many Kanji characters have the same pronunciation, so a set of Hiragana/Katakana characters can represent many Kanji characters or strings of Kanji characters. OS/2 maintains dictionaries of Yomi/Kanji pairs which it uses for conversion. Since one Yomi string may correspond to many different Kanji strings, the user will generally have a list of candidates which he may view or cycle through in order to achieve the desired Kanji. This process of translating Hiragana/Katakana into the correct Kanji is called Kana-Kanji conversion. Unconversion is the reverse process of going from the Kanji back to the original Yomi.

Kanji Phrase - A Kanji character or string in Kanji characters which corresponds to a string of Yomi characters in one of the conversion dictionaries used by OS/2.

SGML - Standardized General Markup Language. A markup language consisting of begin and end tags used to prepare structured documents. Refer to International Standards Organization standard 8879-1986 for definition and details.

Element - SGML defined entity consisting of a begin tag and its content including an end tag if necessary.

Structured Document - A document which has a defined hierarchy of elements such as that defined by SGML.

Current editors provide a Kana-Kanji conversion function. However, when in conversion mode, the user's movement is restricted to the active phrase area, i.e., an area specifically designated for entering Yomi and converting it to Kanji before placing the normalized Kanji characters actually into the document. The user may not move the cursor to any other part of the document until he has finished converting the Kanji and placed the normalized Kanji characters into the document. For example, the user is in Kanji conversion mode and enters five Hiragana characters and converts them to Kanji. Cursor movement is now restricted to the Kanji phrase text area. Only after the user fixes (normalizes) the Kanji characters is the cursor free to move to other positions within the document. Therefore, due to this restriction, there can be only one active Kanji state string within the entire document.

In summary, all current editors use a special area outside of the actual document content to create Kanji strings through Kanji conversion routines. Only in this area can Kanji-state text exist and while the text is in Kanji state, the user cannot move the cursor outside of this conversion area. And then, once the Kanji is placed in the document, it is normalized automatically and the user can no longer manipulate this Kanji through the standard Kana-Kanji conversion routines.

OBJECTS OF THE INVENTION

It is an object of the invention to provide an improved means for flexibly changing Yomi phrases and Kanji phrases in a structured document editor.

SUMMARY OF THE INVENTION

This and other objects, features, and advantages are accomplished by the invention. In accordance with the invention, a structured document editor includes a normal state, a Yomi state, a Kanji state, and an active state. In the normal state, when the operator types Yomi characters on the keyboard, the corresponding Yomi character is directly displayed on the display. In the Yomi state, when a Yomi character is typed on the keyboard, a Yomi text node structure is assembled. The text node structure in the Yomi state will include the Yomi character string along with control information. When the operator wishes to convert the Yomi phrases into the corresponding Kanji phrases, the Yomi string is accessed from the Yomi text node structure and is subjected to a conversion process. The process returns each Kanji phrase and the corresponding Yomi phrase and a bookmark to the conversion table which was used in carrying out the conversion. In accordance with the invention, the returned Kanji phrase and corresponding Yomi phrase and the bookmark are assembled into a new text node structure. The new text node structure assembles a Kanji phrase structure and a corresponding Yomi phrase structure for each Kanji phrase returned in the conversion process. The Kanji phrase structure includes a pointer to the corresponding Yomi phrase structure and the Yomi phrase structure, in turn, includes a return pointer to the Kanji phrase structure. Also included in the Kanji phrase structure and Yomi phrase structure is control information which provides for the display of the Kanji phrase structure which will substitute the Yomi phrase structure.

If the conversion process has returned a Kanji phrase which the operator deems not a suitable conversion or not an intended conversion of the Yomi phrase, then the operator has the option of asking the conversion process for the next candidate Kanji phrase. One significant feature of the invention is that the operator may have moved the cursor of the editor completely outside of the current Kanji phrase being displayed and the operator may then return at a later time to the Kanji phrase to obtain the next candidate phrase from the conversion process. When the operator wishes to review the next candidate Kanji phrase, the operator returns the cursor to the new Kanji phrase. The operator then selects the Kanji conversion process. Then, in accordance with the invention, the Kanji phrase structure is accessed to get the pointer to the corresponding Yomi phrase structure. Then the Yomi phrase structure is accessed to get the Yomi text string and its associated bookmark. Then, the Yomi phrase structure and the associated bookmark are operated upon by the conversion process, which commences the selection of the next candidate Kanji phrase after the bookmark in the conversion table. The next candidate Kanji phrase is then returned along with a new bookmark from the conversion table.

Still another significant feature of the invention is the ability to unconvert an existing Kanji phrase back into its corresponding Yomi phrase. In order to accomplish this, the operator moves the cursor into the Kanji phrase which is desired to be unconverted. The operator then selects the unconvert process. Then, in accordance with the invention, the Kanji phrase structure is accessed to get the pointer to the corresponding Yomi phrase structure. Then the Yomi phrase structure is accessed to extract the Yomi phrase. Then, a new Yomi phrase structure is assembled which includes the extracted Yomi phrase, without the bookmark. In accordance with the invention, a pointer is included in the new Yomi phrase structure which updates the previous pointer value to the previous pointer of the Kanji phrase structure. Then, the existing Kanji phrase structure is removed. Finally, the Yomi text string is displayed in the place of the Kanji phrase.

In this manner, Yomi phrases and Kanji phrases can be flexibly edited and manipulated in a structured document editor.

DESCRIPTION OF THE FIGURES

These and other objects, features and advantages of the invention will be more fully appreciated with reference to the accompanying figures.

DISCUSSION OF THE PREFERRED EMBODIMENT

Figure 1:
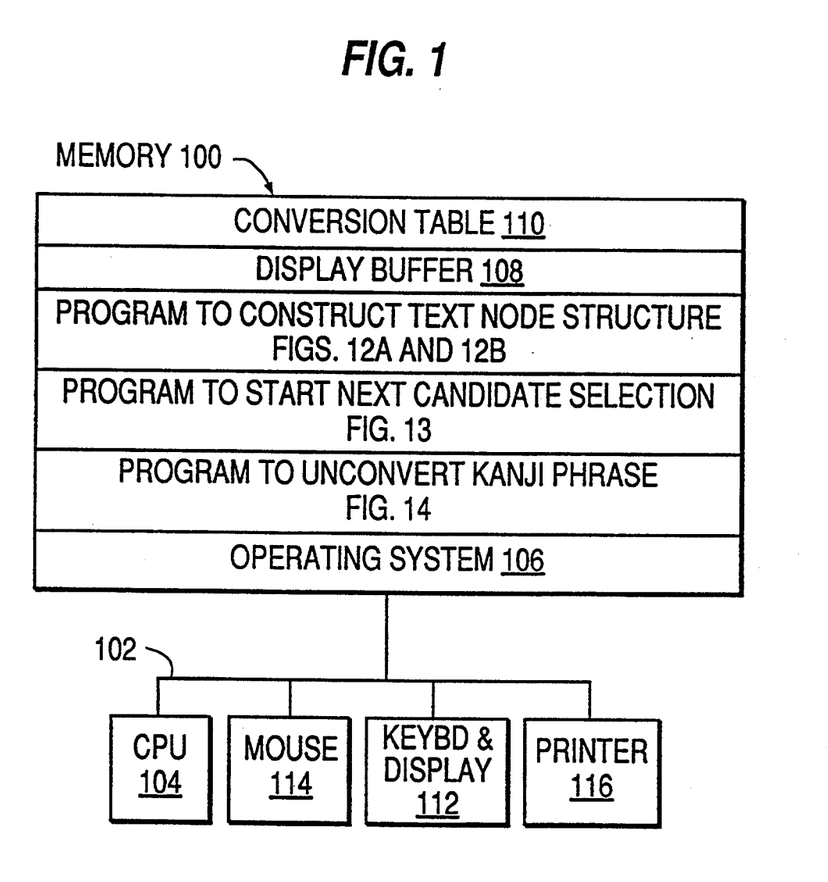
FIG. 1 is an architectural diagram of a data processing system for carrying out the invention.

The overall architectural diagram of a system for carrying out the invention is shown in FIG. 1. A memory 100 is coupled over a bus 102 to a CPU 104. The memory 100 includes programs which are a sequence of executable instructions which embody the flow diagrams shown in FIGS. 12, 13 and 14. Also included in the memory 100 is an operating system 106, a display buffer 108 and the Yomi to Kanji conversion table 110. Also shown in the architectural diagram of FIG. 1 is a keyboard and display 112, a mouse pointing device 114, and a printer 116.

DOCUMENT STRUCTURE AND CONVERSION EXAMPLES FOR DBCS INVENTIONS

The purpose of these examples is to demonstrate the internal document structure which facilitates the following (Japanese will be used in the examples, but the concepts extend to Korean, Traditional Chinese, and all other ideographic DBCS languages):

1. The simultaneous existence of both English and Japanese text in the same document, each with a different font if so desired.

2. The simultaneous existence of multiple unconverted Yomi strings within the document, each of which may be returned to at any time (including after saving an closing the document and reinvoking it) and manipulated at will.

3. The simultaneous existence of multiple unfixed (not normalized) Kanji strings within the document, each of which may be returned to at any time and manipulated at will. Note that these items 2 and 3 essentially describe the ability to perform all Kana-Kanji conversion functions within the document at the current cursor position with no loss of information until the user requests it. This is in contrast to all known prior art in which all information necessary for Kana-Kanji conversion routines is lost once the user places Kanji text into the document from the Kana-Kanji editing window or otherwise aborts the current operation in the Kana-Kanji editing window.

Figure 2:
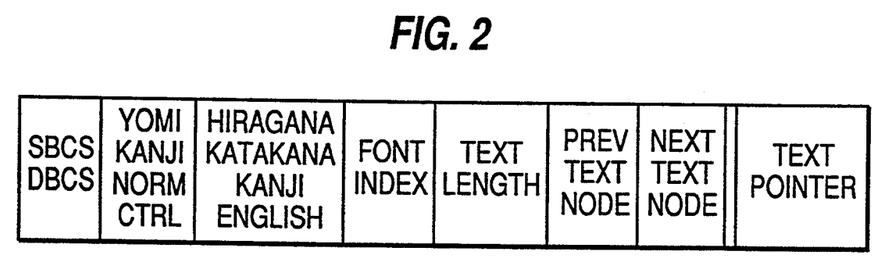
FIG. 2 is a format diagram of a generic text node.

The basic element containing text in the type of structured document used in these inventions is the text node. The text node contains the actual text as well as all the information necessary to maintain the state of the text in terms of font, SBCS or DBCS, Yomi or Kanji, etc. FIG. 2 is a basic representation of a text node. Not all fields are represented; only those relevant to the current inventions.

1. SBCS/DBCS

Indicates whether this text node contains single-byte text or double-byte text. Text of different sizes will not appear in the same text node.

2. YOMI/KANJI/NORM/CTRL

Indicates the state that the text in the current text node is in:

YOMI: Text (usually Hiragana or Katakana) which has been entered in conversion mode but which has not yet been converted to Kanji. Text will remain in this state regardless of the users actions, unless he converts it, normalizes it, or deletes it.

KANJI: Text which has been converted to Kanji characters from Yomi but which has not yet been normalized. Text in this state will still reference all of the necessary information to perform future Kana-Kanji conversion functions and will remain in this state until the user unconverts it, normalizes it, or deletes it.

NORM: Text which is neither in YOMI or KANJI state. This is the standard state of English text and of Japanese text which will no longer be used in any conversion routines.

CTRL: Text which is control information containing the original Yomi which converted to a particular Kanji phrase and other control data passed back from the system conversion routines. There is one of these text nodes attached to each Kanji-state phrase in the document and they are not displayed. They contain all the information necessary to do further Kana-Kanji conversion routines on the associated Kanji phrase if requested.

Text of different states will never exist in the same text node.

3. HIRAGANA/KATAKANA/KANJI/ENGLISH

Indicates the language and type of the characters in the text node. Hiragana and Katakana are phonetic character sets used for converting to Kanji. Kanji is the full set of Japanese language ideographic characters. English is English. Text in different languages/types will never exist in the same text node.

4. FONT INDEX

This is an index into a font table which gives all of the font information for the text in the current text node. Text of different fonts will never exist in the same text node.

5. TEXT LENGTH

This is the length, in bytes, of the actual text in the current text node.

6. PREV TEXT NODE

This is a pointer to the previous text node in the document.

7. NEXT TEXT NODE

This is a pointer to the next text node in the document.

8. TEXT POINTER

This is a pointer to a memory area which contains the actual text data in this text node.

Note that some unexpected combinations of text node flags are possible. For instance, SBCS English text can be in Yomi state and a certain range of Katakana phonetic characters are actually single-byte text.

These text nodes will be used to describe the storage of text in a structured document and to demonstrate how the document structure changes to allow SBCS and DBCS text to exist simultaneously in the document, how to maintain multiple Yomi and/or Kanji strings, and how the conversion process from Yomi to Kanji works.

EXAMPLES

The following examples describe the accompanying figures and demonstrate the internal structure necessary to support the inventions. The following conventions are used:

- K# = A Kanji Character
- Y# = A Yomi Character (In these examples, Hiragana)
- English characters will be represented as is Each figure except 1A will show the sequence of text nodes stored in memory which represent the given string.

Figure 6:
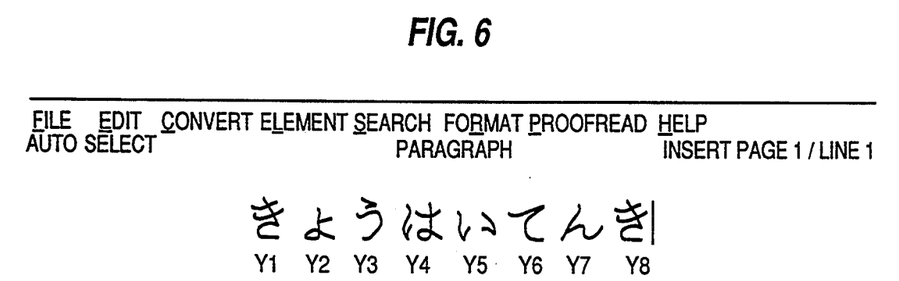
FIG. 6 illustrates an unconverted Yomi string.
Figure 7:
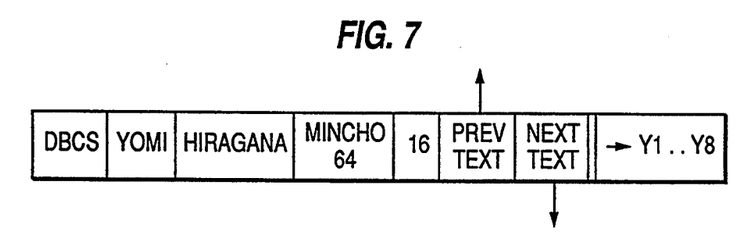
FIG. 7 shows the text node for an unconverted Yomi string.

FIGS. 6 & 7 - UNCONVERTED YOMI STRING

This text string is double-byte Hiragana text in Yomi state using a Mincho 64-point font. The text is ready for conversion to Kanji or may be edited in any way by the user. All of the Yomi text is contiguous and in one text node.

Figure 3:
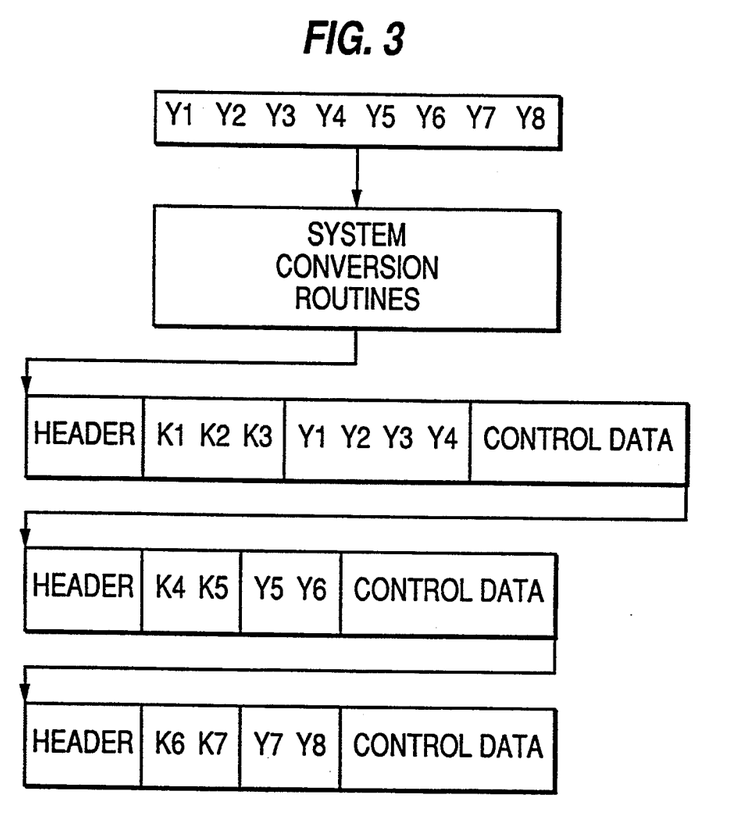
FIG. 3 is an organizational diagram showing Yomi to Kanji conversion.

FIG. 3 - OPERATING SYSTEM CONVERSION FROM YOMI TO KANJI

This figure shows the conversion of the Yomi string to Kanji by the system conversion routines. The editor passes the Yomi string to the system which uses the system conversion dictionary (which may be appended to by the user) and complex conversion algorithms to convert the string to Kanji. The system breaks the string into Kanji phrases which are logical groupings of Kanji characters. For each phrase, the most common Kanji translation (there may be many) is selected.

The system returns to the editor a data stream consisting of a series of Kanji phrases. Each phrase is followed by control information which consists of the original Yomi for just that Kanji phrase and certain other information which will be needed by the system to expedite any future Kana-Kanji conversion routines performed on that Kanji phrase (such as finding the next Kanji candidate for the Yomi if the default is not what was wanted).

Figure 8:
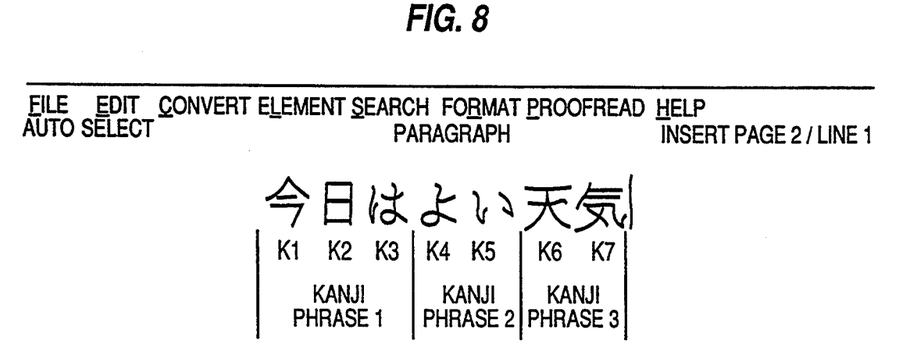
FIG. 8 shows a converted Kanji string.
Figure 9:
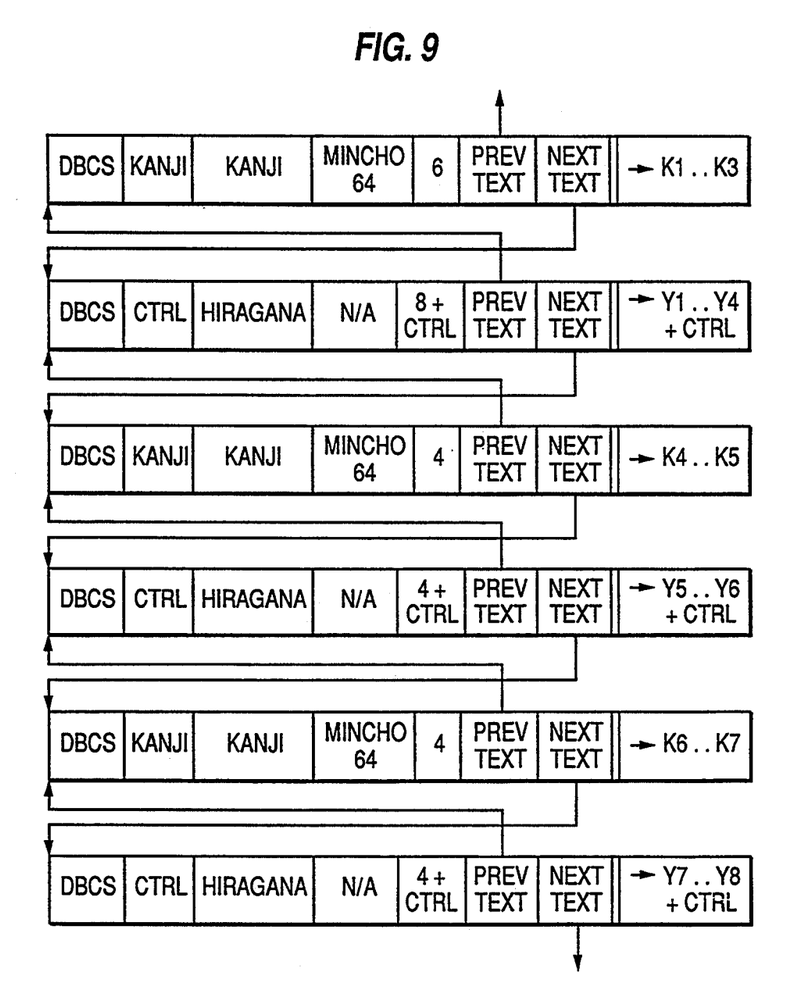
FIG. 9 shows a text node for a converted Kanji string.

FIGS. 8 & 9 - CONVERTED KANJI STRING

This text string is double-byte Kanji text in Kanji state using a Mincho 64-point font. The text takes up six text nodes, one for each of three Kanji phrases and one for each set of control information. The text has been converted and is in the document, but each phrase may still be converted to the next candidate, unconverted back to Yomi, etc.

Figure 4:
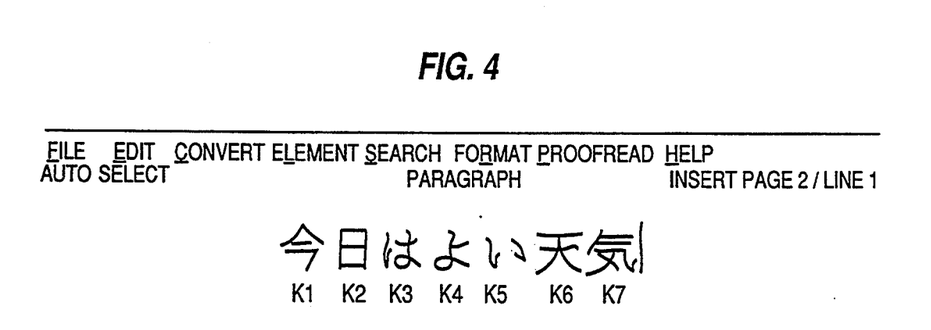
FIG. 4 illustrates a normalized Kanji string.
Figure 5:
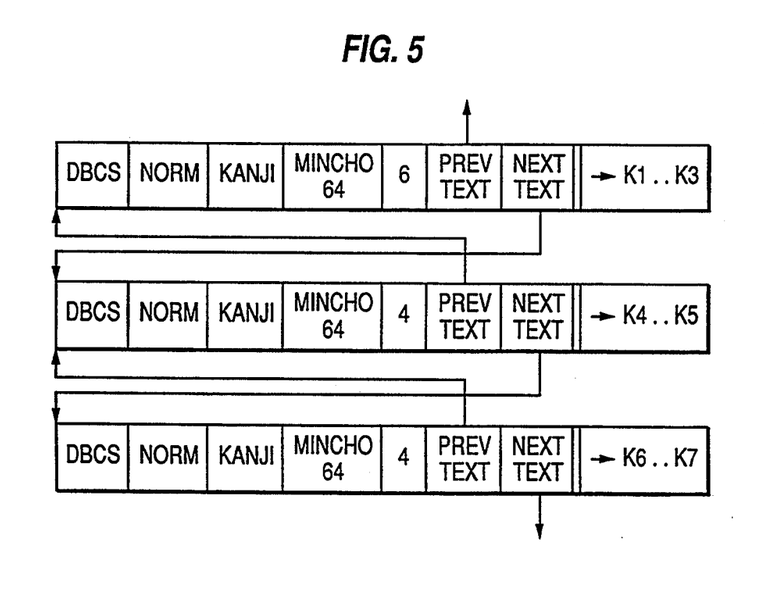
FIG. 5 illustrates the text node for a normalized Kanji string.

FIGS. 4 & 5 - NORMALIZED KANJI STRING

This text string is double-byte Kanji text in normalized state using a Mincho 64-point font. The text takes up three text nodes, one for each of the three Kanji phrases. The Yomi/Control information is gone at the request of the user and the text is no longer a candidate for Kana-Kanji conversion routines.

Figure 10:
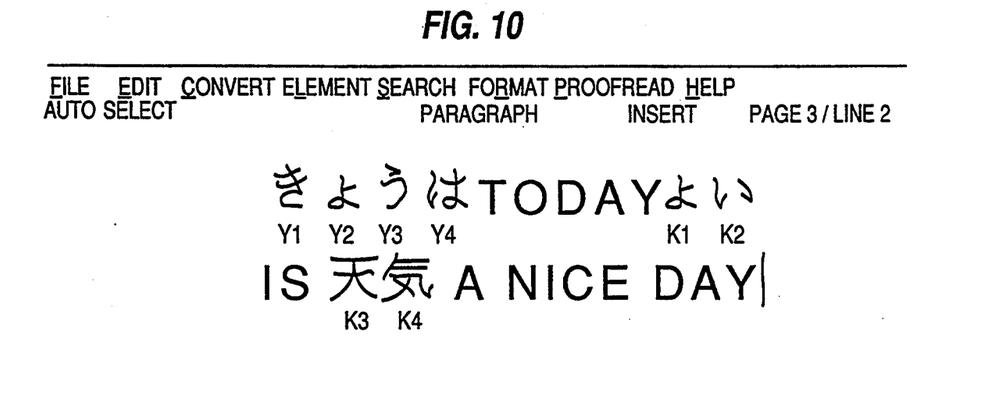
FIG. 10 shows a mixed Yomi and Kanji and English string.
Figure 11:
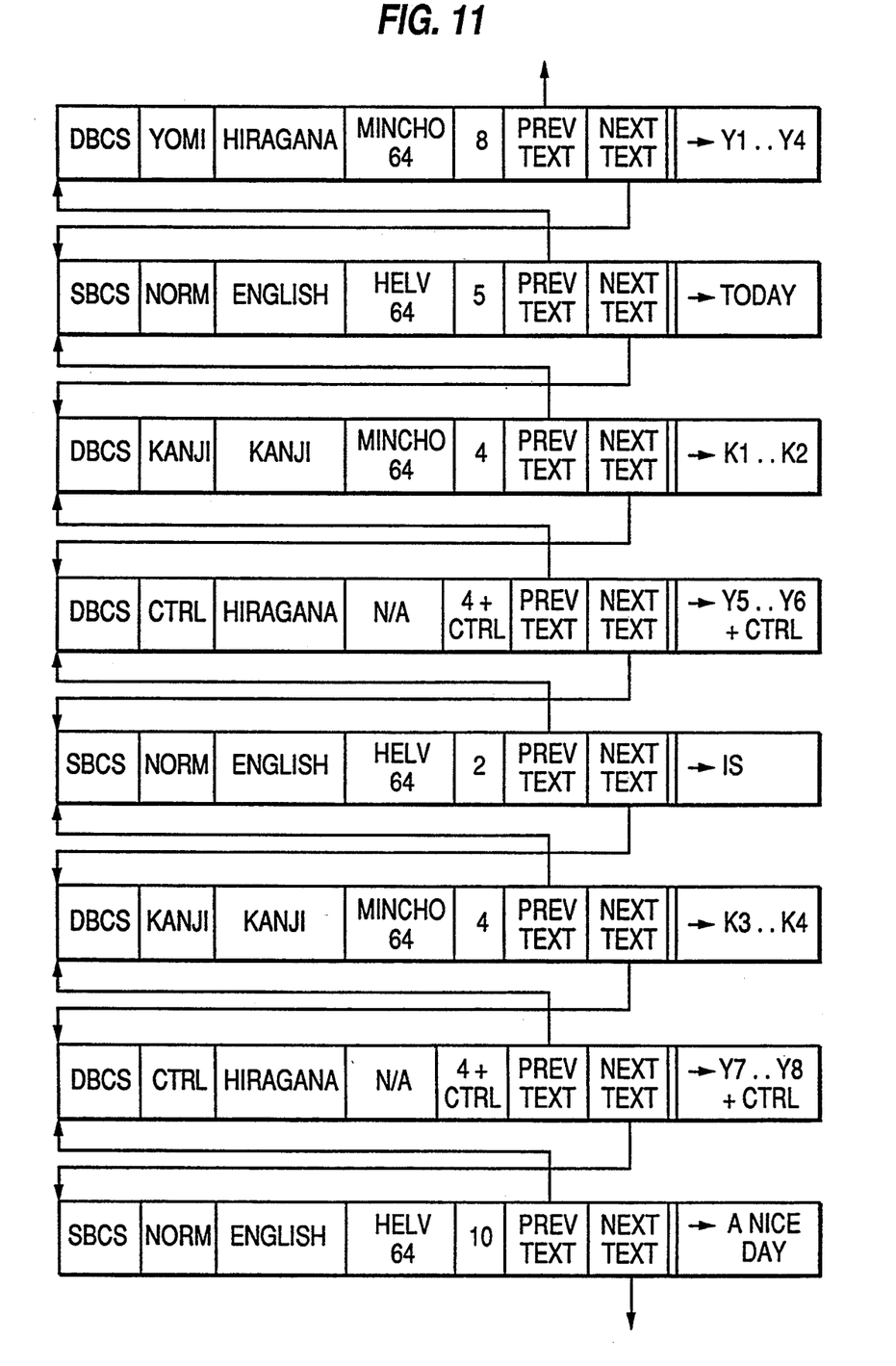
FIG. 11 shows a text node for a mixed Yomi and Kanji and English string.

FIGS. 10 & 11 - MIXED YOMI/KANJI/ENGLISH STRING

This text string is made up of the following:
- A double-byte Hiragana string in Yomi state in 64-point Mincho font taking up one text node.
- A single-byte English string in normal state in 64-point Helvetica font taking up one text node.
- A double-byte Kanji string in Kanji state in 64-point Mincho font taking up two text nodes, one for the Kanji and one for the control data.
- A second single-byte English string in normal state in 64-point Helvetica font taking up one text node.
- A second double-byte Kanji string in Kanji state in 64-point Mincho font taking up two text nodes, one for the Kanji and one for the control data.
- A third single-byte English string in normal state in 64-point Helvetica font taking up one text node.

Figure 12A:
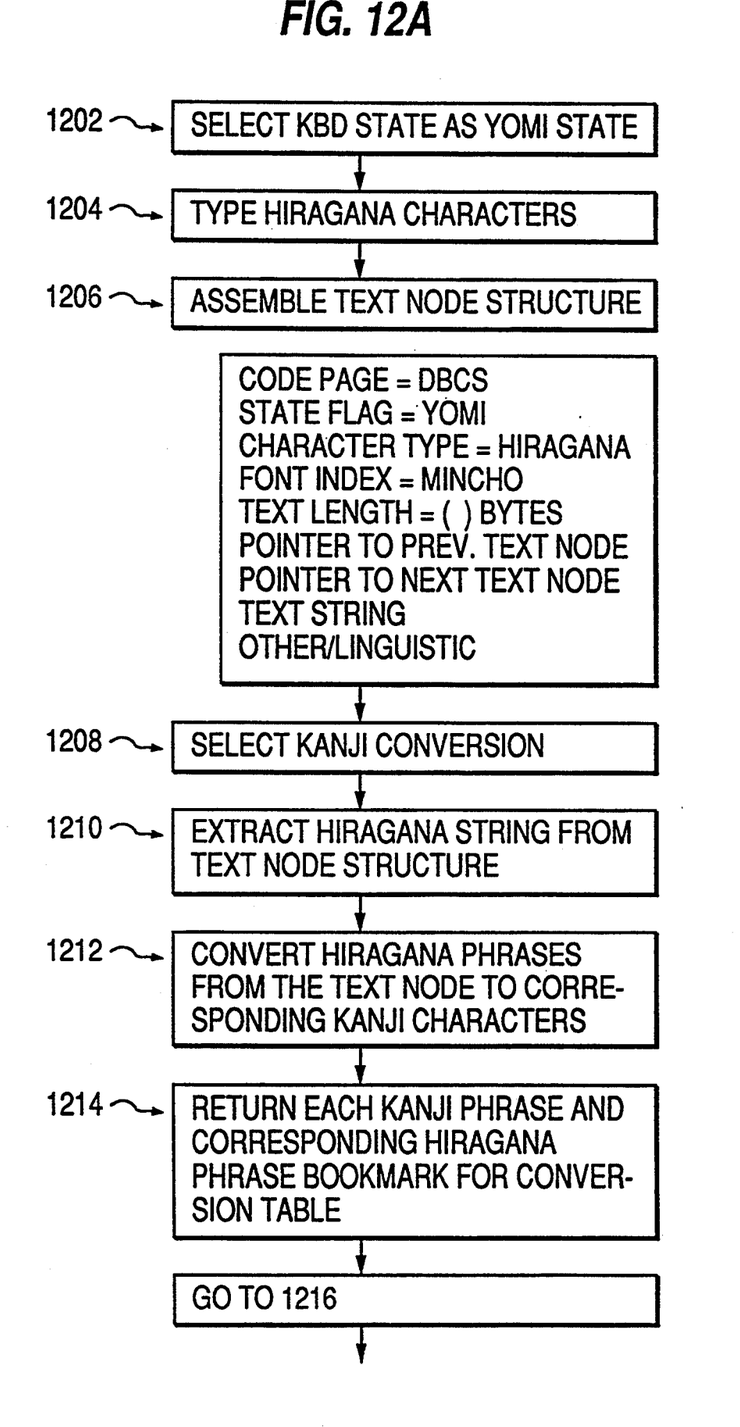
FIG. 12 consists of FIGS. 12A and 12B and is a flow diagram of the sequence of operational steps to carry out the construction of a text node structure including the assembly of a Kanji phrase structure and a corresponding Hiragana phrase structure.

FIG. 12A is a flow diagram of the process to assemble a text node structure and to return each Kanji phrase and corresponding Hiragana phrase and bookmark for the conversion table.

FIG. 12A includes the following steps 1202 to 1214.

| | |
|---|---|
| 1202 | SELECT KBD STATE AS YOMI STATE |
| 1204 | TYPE HIRAGANA CHARACTERS |
| 1206 | ASSEMBLE TEXT NODE STRUCTURE<br>CODE PAGE = DBCS<br>STATE FLAG = YOMI<br>CHARACTER TYPE = HIRAGANA<br>FONT INDEX = MINCHO<br>TEXT LENGTH = ( ) BYTES<br>POINTER TO PREV. TEXT NODE<br>POINTER TO NEXT TEXT NODE<br>TEXT STRING<br>OTHER/LINGUISTIC |
| 1208 | SELECT KANJI CONVERSION |
| 1210 | EXTRACT HIRAGANA STRING FROM TEXT NODE STRUCTURE |
| 1212 | CONVERT HIRAGANA PHRASES FROM THE TEXT NODE TO CORRESPONDING KANJI CHARACTERS |
| 1214 | RETURN EACH KANJI PHRASE AND CORRESPONDING HIRAGANA PHRASE BOOKMARK FOR CONVERSION TABLE<br>GO TO 1216 |

Figure 12B:
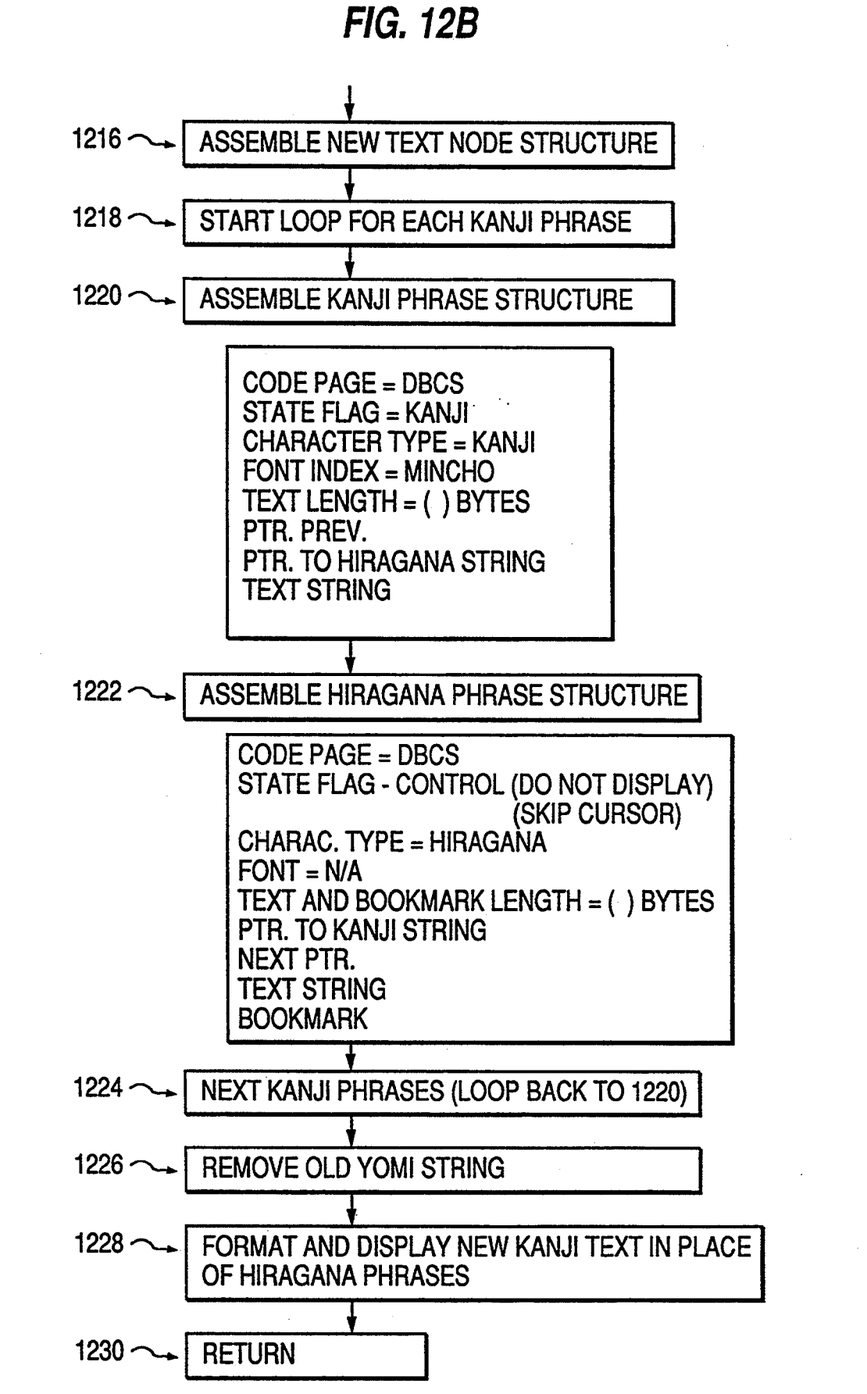

FIG. 12B continues the process shown in FIG. 12A, and carries out the portion of the process which assembles the Kanji phrase structure and assembles the Hiragana phrase structure and formats and displays the new Kanji text in place of the Hiragana phrases.

FIG. 12B includes the following steps 1216 to 1220.

| | |
|---|---|
| 1216 | ASSEMBLE NEW TEXT NODE STRUCTURE |
| 1218 | START LOOP FOR EACH KANJI PHRASE |
| 1220 | ASSEMBLE KANJI PHRASE STRUCTURE<br>CODE PAGE = DBCS<br>STATE FLAG = KANJI<br>CHARACTER TYPE = KANJI<br>FONT INDEX = MINCHO<br>TEXT LENGTH = ( ) BYTES<br>PTR. PREV.<br>PTR. TO HIRAGANA STRING<br>TEXT STRING |
| 1222 | ASSEMBLE HIRAGANA PHRASE STRUCTURE<br>CODE PAGE = DBCS<br>STATE FLAG = CONTROL (DO NOT DISPLAY)<br>(SKIP CURSOR)<br>CHARAC. TYPE = HIRAGANA<br>FONT = N/A<br>TEXT AND BOOKMARK LENGTH = ( ) BYTES<br>PTR. TO KANJI STRING<br>NEXT PTR.<br>TEXT STRING<br>BOOKMARK |
| 1224 | NEXT KANJI PHRASES (LOOP BACK TO 1220) |
| 1226 | REMOVE OLD YOMI STRING |
| 1228 | FORMAT AND DISPLAY NEW KANJI TEXT IN PLACE OF HIRAGANA PHRASES |
| 1230 | RETURN |

Figure 13:
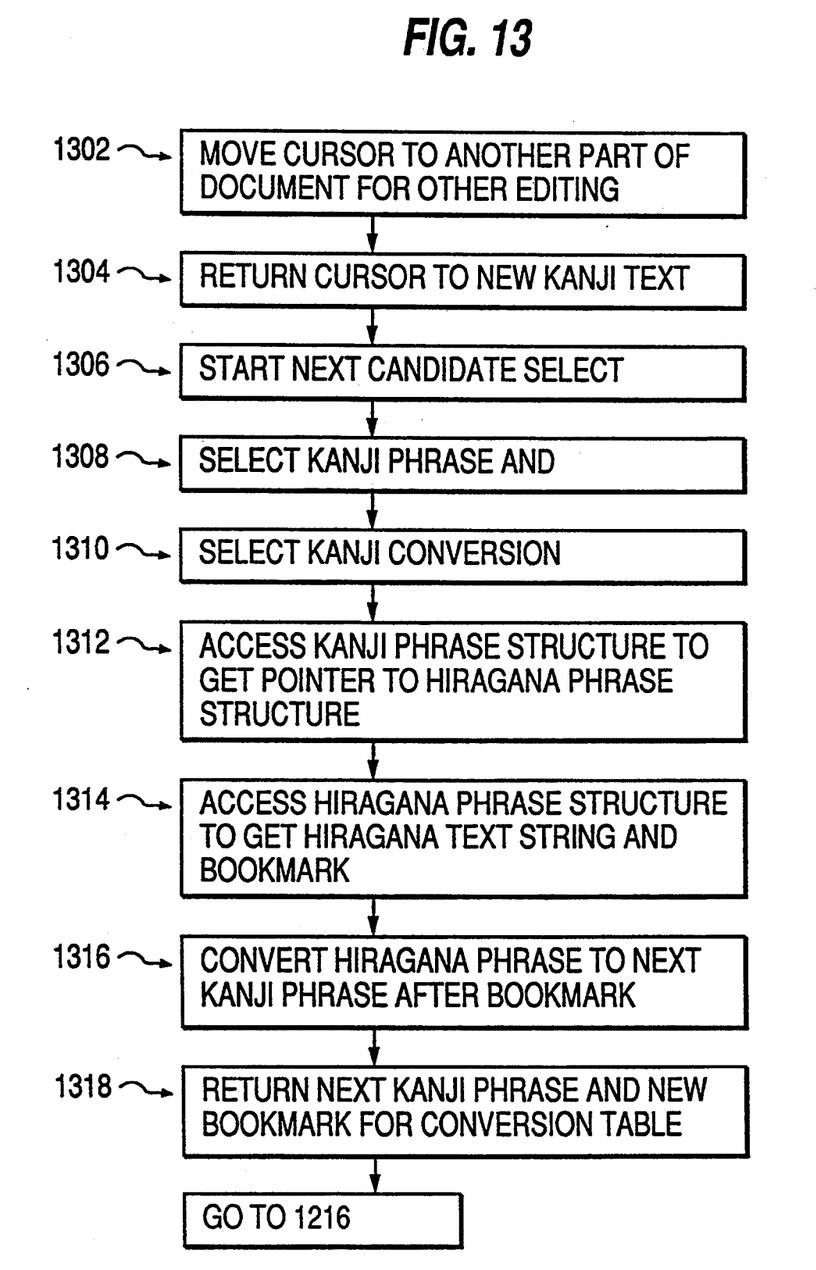
FIG. 13 is a flow diagram of a sequence of operational steps to carry out the process of starting the next candidate selection for a Kanji phrase.

FIG. 13 shows that the operator can move the cursor all around the structured document text performing other functions and then at a later time return to the new Kanji text for the purpose of selecting a next candidate Kanji phrase. FIG. 13 shows a first step of moving the cursor to another part of the document for other editing. Then FIG. 13 starts the next candidate selection flow diagram.

FIG. 13 includes the following steps 1302 to 1320.

| | |
|---|---|
| 1302 | MOVE CURSOR TO ANOTHER PART OF DOCUMENT FOR OTHER EDITING |
| 1304 | RETURN CURSOR TO NEW KANJI TEXT |
| 1306 | START NEXT CANDIDATE SELECT |
| 1308 | SELECT KANJI PHRASE AND |
| 1310 | SELECT KANJI CONVERSION |
| 1312 | ACCESS KANJI PHRASE STRUCTURE TO GET POINTER TO HIRAGANA PHRASE STRUCTURE |
| 1314 | ACCESS HIRAGANA PHRASE STRUCTURE TO GET HIRAGANA TEXT STRING AND BOOKMARK |
| 1316 | CONVERT HIRAGANA PHRASE TO NEXT KANJI PHRASE AFTER BOOKMARK |
| 1318 | RETURN NEXT KANJI PHRASE AND NEW BOOKMARK FOR CONVERSION TABLE<br>GO TO 1216 |

Figure 14:
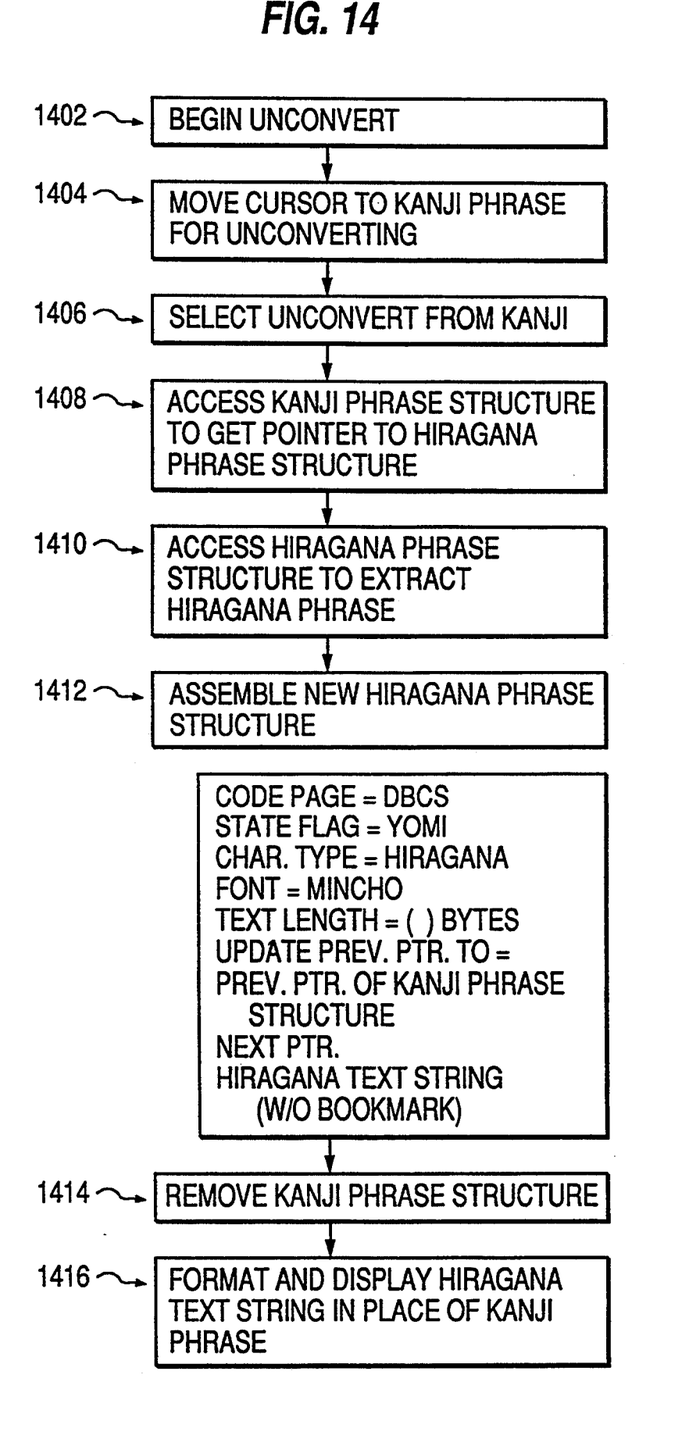
FIG. 14 is a flow diagram of the sequence of operational steps to carry out the process of unconverting a Kanji phrase into its corresponding Hiragana phrase.

FIG. 14 shows the flow diagram for assembling a new Hiragana phrase structure in the unconverting of an existing Kanji phrase. Thus it is seen that the invention enables the flexible editing and alteration of Yomi phrases and Kanji phrases in a structured document at any time during the editing process. The operator is able to leave an existing Kanji or Yomi section and go on to other parts of the document and then at a later time return to those sections to edit those sections or to select new candidate Kanji phrases for existing Kanji phrase sections.

FIG. 14 includes the following steps 1402 to 1416.

| | |
|---|---|
| 1402 | BEGIN UNCONVERT |
| 1404 | MOVE CURSOR TO KANJI PHRASE FOR UNCONVERTING |
| 1406 | SELECT UNCONVERT FROM KANJI |
| 1408 | ACCESS KANJI PHRASE STRUCTURE TO GET POINTER TO HIRAGANA PHRASE STRUCTURE |
| 1410 | ACCESS HIRAGANA PHRASE STRUCTURE TO EXTRACT HIRAGANA PHRASE |
| 1412 | ASSEMBLE NEW HIRAGANA PHRASE STRUCTURE<br>CODE PAGE = DBCS |

|      | -continued |
|------|------------|
|      | STATE FLAG = YOMI |
|      | CHAR. TYPE = HIRAGANA |
|      | FONT = MINCHO |
|      | TEXT LENGTH = ( ) BYTES |
|      | UPDATE PREV. PTR. TO = |
|      | PREV. PTR. OF KANJI PHRASE STRUCTURE |
|      | NEXT PTR. |
|      | HIRAGANA TEXT STRING (W/O BOOKMARK) |
| 1414 | REMOVE KANJI PHRASE STRUCTURE |
| 1416 | FORMAT AND DISPLAY HIRAGANA TEXT STRING IN PLACE OF KANJI PHRASE |

Although a specific embodiment of the invention has been disclosed, it will be understood by those having skill in the art that changes can be made to those specific embodiments without departing from the spirit and the scope of the invention.

What is claimed is:

1. A computer implemented method on a computer system which includes a CPU means, input means, output means, memory means, and display means for flexibly managing a structured document which includes Yomi phrases and Kanji phrases, comprising the steps of:

selecting a keyboard state of said input means as a Yomi state;

typing Yomi characters;

assembling in said memory a text node structure which includes a pointer to a previous text node, a pointer to a next text node, and a text string which includes Yomi phrases;

selecting via said input means a Kanji conversion process;

extracting said Yomi string from said text node structure in said memory means;

converting in said CPU said Yomi string phrases from said text node structure in said memory means into corresponding Kanji phrases;

returning to said memory said Kanji phrases and said corresponding Yomi phrases and a bookmark value from said conversion process, said bookmark value giving the position in a conversion table in said memory means from which said returned Kanji phrase was obtained.

2. The method of claim 1 includes the further steps of: assembling in said memory a new text node structure using the same Kanji and Yomi phrases as returned in the last step of claim 1, which includes the following steps:

for at least one Kanji phrase, assembling in said memory a Kanji phrase structure which includes a pointer to a previous text node and a pointer to a corresponding Yomi string, which Kanji phrase structure also includes a Kanji phrase string;

assembling in said memory a Yomi phrase structure which includes a pointer to said Kanji phrase structure, a pointer to a next text node, and said Yomi text string and which Yomi phrase structure further includes said bookmark value;

removing from said memory an old Yomi string;

displaying on said display means said new Kanji text in place of said Yomi phrases.

3. The method of claim 2 which further comprises the steps for selecting a next Kanji candidate, comprising:

returning on said display means a cursor to said new Kanji text;

selecting via said input means said Kanji phrase;

selecting via said input means said Kanji conversion process;

accessing said memory means with said CPU means said Kanji phrase structure to get said pointer to said Yomi phrase structure;

accessing said memory means with said CPU means said Yomi phrase structure to get said Yomi phrase string and said bookmark;

converting with said CPU means said Yomi phrase to a next Kanji phrase which is positionally located in a conversion table after a bookmark location specified by said bookmark value;

returning to said memory means said next Kanji phrase and a new bookmark value from the conversion table.

4. The method of claim 2 which further comprises the steps for unconverting said Kanji phrase, comprising the steps of:

moving via said input means a cursor on said display means to said Kanji phrase;

selecting via said input means an unconvert process for said Kanji phrase;

accessing in said memory means said Kanji phrase structure to get said pointer to said Yomi phrase structure;

accessing in said memory means said Yomi phrase structure to extract said Yomi phrase;

assembling in said memory means via said CPU means a new Yomi phrase structure which includes an updated pointer value for to said previous text node pointer of said Kanji phrase structure and a next pointer to a next text and said Yomi phrase text string;

removing from said memory means said Kanji phrase structure;

displaying on said display means said Yomi text string in place of said Kanji phrase.

* * * * *